United States Patent

Tokoro et al.

[11] Patent Number: 6,130,869
[45] Date of Patent: Oct. 10, 2000

[54] MULTIPLE-CHANNEL INFORMATION REPRODUCING APPARATUS INCLUDING BUFFER MEMORIES ASSIGNED TO CHANNELS RESPECTIVELY

[75] Inventors: Kyosuke Tokoro; Yoshiya Imamura, both of Tokyo, Japan

[73] Assignee: Victor Company of Japan, Ltd., Yokohama, Japan

[21] Appl. No.: 09/003,828

[22] Filed: Jan. 7, 1998

[51] Int. Cl.[7] ...................................................... G11B 5/09
[52] U.S. Cl. ............................................... 369/54; 369/49
[58] Field of Search .................................. 369/54, 48, 49, 369/60, 32, 124, 47

[56] References Cited

U.S. PATENT DOCUMENTS

| | | | |
|---|---|---|---|
| 5,412,628 | 5/1995 | Yamazaki et al. | 369/54 |
| 5,506,825 | 4/1996 | Gushima et al. | 369/49 |
| 5,526,507 | 6/1996 | Hill . | |
| 5,563,859 | 10/1996 | Masuda et al. | 369/59 |
| 5,566,144 | 10/1996 | Shinada | 369/32 |
| 5,587,978 | 12/1996 | Endo et al. | 369/48 |
| 5,757,737 | 5/1998 | Tanaka | 369/60 |

FOREIGN PATENT DOCUMENTS

| | | |
|---|---|---|
| 0804028 | 10/1997 | European Pat. Off. . |
| 5072026 | 10/1993 | Japan . |
| 6001430 | 1/1994 | Japan . |
| 6083674 | 3/1994 | Japan . |

OTHER PUBLICATIONS

National Conference of the Electronic Data Communications Society, Spring 1991; by Tokoro; p. 3–352 (w/ English translation).

*Primary Examiner*—Thang V. Tran
*Attorney, Agent, or Firm*—Pollock, Vande Sande & Amernick

[57] ABSTRACT

An information reproducing apparatus includes a recording medium storing information. Buffer memories are assigned to channels respectively. Detection is made as to a size of an unoccupied area in each of the buffer memories. Pieces of the information are sequentially read out from the recording medium, and are distributed to the buffer memories and are written thereinto at first rates on a time-division basis. The pieces of the information are sequentially and continuously read out from the buffer memories in parallel at a second rate lower than the first rates. A piece of the information is permitted to be read out from the recording medium and to be written into one of the buffer memories when the detected size relating to the buffer memory is equal to or greater than a predetermined size. A piece of the information is inhibited from being read out from the recording medium and from being written into one of the buffer memories when the detected size relating to the buffer memory is smaller than the predetermined size.

5 Claims, 9 Drawing Sheets

MULTIPLE-CHANNEL INFORMATION REPRODUCING APPARATUS INCLUDING BUFFER MEMORIES ASSIGNED TO CHANNELS RESPECTIVELY

BACKGROUND OF THE INVENTION

1. Field of the Invention

This invention relates to an information reproducing apparatus or an information retrieving apparatus which can be used in various systems such as an audio on-demand service system, a video on-demand service system, and a communication "karaoke" system.

2. Description of the Related Art

In on-demand service systems, a computer center has a database containing, for example, audio information and video information. A user is allowed to access the database in the computer center via a communication line when a user's request is accepted by the computer center. Then, the user receives desired information from the database. It is desirable that the database quickly outputs desired information in response to a user's request.

SUMMARY OF THE INVENTION

It is an object of this invention to provide an improved information reproducing apparatus.

A first aspect of this invention provides an information reproducing apparatus comprising a recording medium storing information; buffer memories assigned to channels respectively; first means for detecting a size of an unoccupied area in each of the buffer memories; second means for sequentially reading out pieces of the information from the recording medium, and distributing the pieces of the information to the buffer memories and writing the pieces of the information into the buffer memories at first rates on a time-division basis (a time sharing basis); third means for sequentially and continuously reading out the pieces of the information from the buffer memories in parallel at a second rate lower than the first rates; fourth means for permitting the second means to read out a piece of the information from the recording medium and to write said piece of the information into one of the buffer memories when the size detected by the first means and relating to said one of the buffer memories is equal to or greater than a predetermined size, and for inhibiting the second means from reading out a piece of the information from the recording medium and from writing said piece of the information into said one of the buffer memories when the size detected by the first means and relating to said one of the buffer memories is smaller than the predetermined size.

A second aspect of this invention is based on the first aspect thereof, and provides an information reproducing apparatus wherein the buffer memories comprise FIFO memories.

A third aspect of this invention is based on the first aspect thereof, and provides an information reproducing apparatus wherein the recording medium has discontinuous areas among which the information distributes.

DESCRIPTION OF THE PREFERRED EMBODIMENTS

Prior-art apparatuses will be explained hereinafter for a better understanding of this invention.

Japanese published examined patent application 5-72026 discloses a file system including a recording medium storing information. In the file system of Japanese application 5-72026, the recording medium is accessed at a speed equal to M times the speed of real-time continuous reproduction of the information from the recording medium. Here, M denotes an integer equal to or greater than 2. This access to the recording medium generates M-time-speed reproduced information. The M-time-speed reproduced information undergoes time division. Specifically, the M-time-speed reproduced information is divided into N information pieces during every cycle, where N denotes an integer between 2 and M. The integer N indicates the number of channels. During every cycle, the N information pieces are stored in N buffer memories, respectively. The N buffer memories assigned to the channels, respectively. The N information pieces are read out from the respective N buffer memories in parallel at a speed equal to the real-time continuous reproduction speed. Regarding each of the N buffer memories, an information piece read out therefrom is continuously followed by a next readout information piece. Thus, N continuous information streams can be simultaneously fed to N different users, respectively.

In the file system of Japanese application 5-72026, N information pieces corresponding to one cycle are temporarily stored in the N buffer memories, respectively. One information piece is transmitted to one buffer memory in a time Ts which is equal to Tr/N, where Tr denotes a time interval corresponding to one period of temporarily storing the N information pieces in the respective N buffer memories. A time necessary for access to the recording medium and an overhead related to transmission cause a loss time Ta which is contained in the transmission time Ts.

It is assumed that video/audio information pieces each corresponding to an actual play time Tp are periodically transmitted to respective N buffer memories at a speed (a transmission rate) Vd. In the case where video/audio information pieces are simultaneously outputted from the respective N buffer memories in a time Tp at a speed (a transmission rate) Vu, a condition for continuous feed of video/audio information pieces from each of the N buffer memories is expressed as $Tp \geq Tr$. It is known that N (the channel number) satisfies the following relation.

$$N \geq Tr/[\{(Vu/Vd)Tp\}+Ta]$$

The channel number N is maximized when Tp=Tr.

In the case where N=3, the file system of Japanese application 5-72026 operates as follows.

Figure 1:
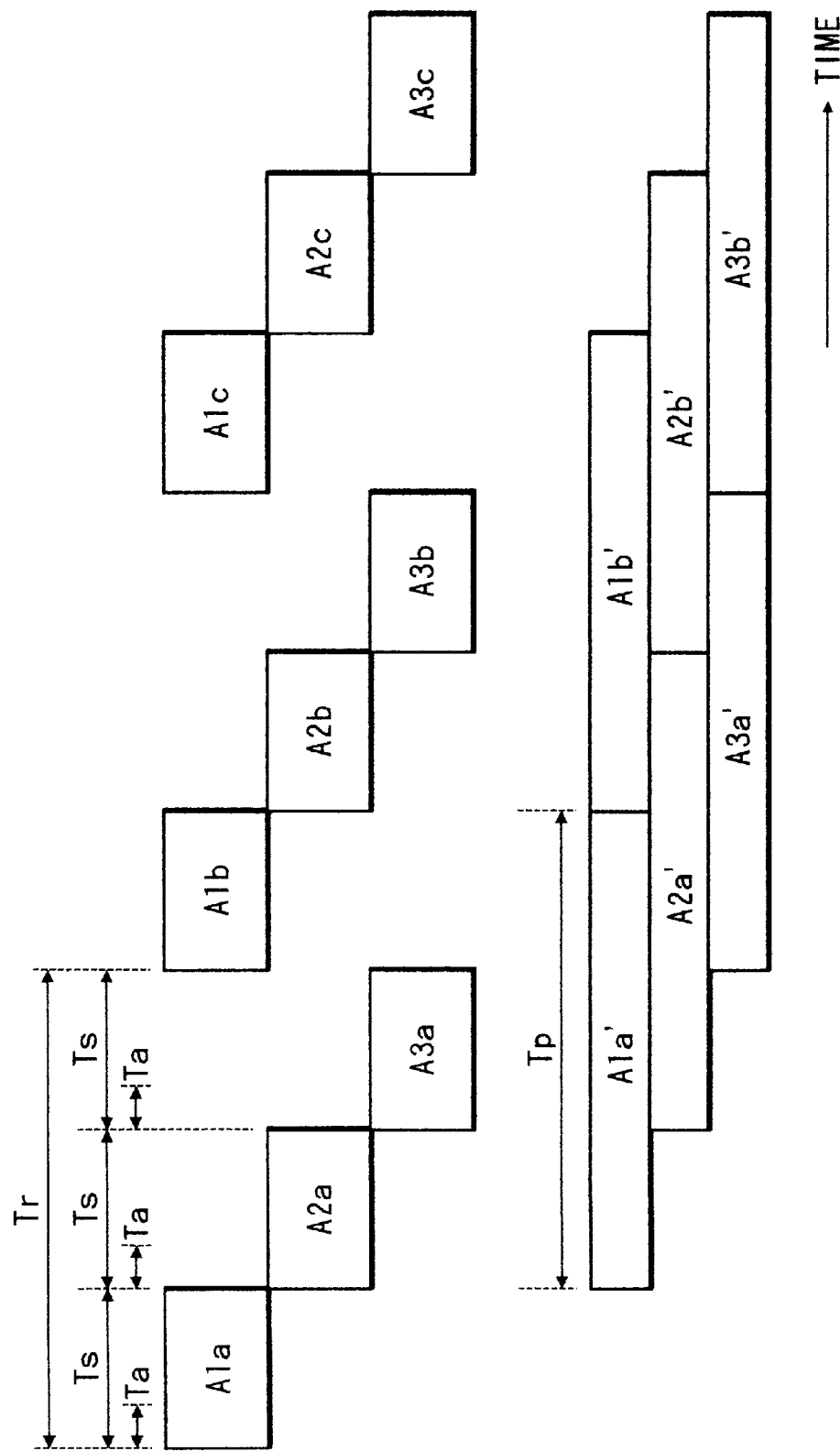
FIG. 1 is a time-domain diagram of transmitted information pieces in a prior-art file system.

With reference to FIG. 1, for a first channel, video/audio information pieces are reproduced from the recording medium during first-channel time slots as denoted by A1a, A1b, and A1c, and are sequentially transmitted to the first-channel buffer memory at a high speed (a high transmission rate). The first video/audio information piece A1a is read out from the first-channel buffer memory in a time Tp at an original speed (an original transmission rate) Vu as denoted by A1a'. The first video/audio information piece A1a' can be transmitted to a user's terminal device.

With reference to FIG. 1, before the first video/audio information piece A1a' terminates, the second video/audio information piece is reproduced from the recording medium and is transmitted to and written into the first-channel buffer memory as denoted by A1b. The second video/audio information piece starts to be read out from the first-channel buffer memory as denoted by A1b' after the end of the first video/audio information piece A1a'. The second video/audio information piece A1b' follows the first video/audio information piece A1a' without any time interval therebetween.

For second and third channels, processes similar to the previously-indicated processes for the first channel are carried out.

With reference to FIG. 1, for the second channel, a first video/audio information piece A2a is read out from the second-channel buffer memory in a time Tp as denoted by A2a'. Before the first video/audio information piece A2a' terminates, a second video/audio information piece is reproduced from the recording medium and is transmitted to and written into the second-channel buffer memory as denoted by A2b. The second video/audio information piece starts to be read out from the second-channel buffer memory as denoted by A2b' after the end of the first video/audio information piece A2a'. The second video/audio information piece A2b' follows the first video/audio information piece A2a' without any time interval therebetween.

With reference to FIG. 1, for the third channel, a first video/audio information piece A3a is read out from the third-channel buffer memory in a time Tp as denoted by A3a'. Before the first video/audio information piece A3a' terminates, a second video/audio information piece is reproduced from the recording medium and is transmitted to and written into the third-channel buffer memory as denoted by A3b. The second video/audio information piece starts to be read out from the third-channel buffer memory as denoted by A3b' after the end of the first video/audio information piece A3a'. The second video/audio information piece A3b' follows the first video/audio information piece A3a' without any time interval therebetween.

Accordingly, continuous reproduced information streams in the respective three channels are available in parallel. As understood from the previous explanation, the file system of Japanese application 5-72026 schedules a series of N time slots per period Tr.

As understood from FIG. 1, in the file system of Japanese application 5-72026, the reading of an information piece from the recording medium and the writing of the information piece to a buffer memory are in given timing relations with the reading of a preceding information piece from the buffer memory. In other words, the reading of an information piece from the recording medium and the writing of the information piece to a buffer memory are synchronized with the reading of a preceding information piece from the buffer memory.

In an on-demand service system using the file system of Japanese application 5-72026, an expected response time from the moment of the occurrence of a new user's request to the moment of the start of the reproduction of desired information tends to be longer as the degree of busyness increases.

Japanese published examined patent application 6-1430 discloses an information file control system designed to shorten an expected response time from the moment of the occurrence of a new user's request to the moment of the start of the reproduction of desired information. In the information file control system of Japanese application 6-1430, necessary information pieces and also reserve data pieces are stored into buffer memories during time slots, respectively. Even in the case where the assignment of a time slot to a channel currently subjected to an information reproducing process is delayed by a certain value, a time slot for reproduction responsive to a new user's request is newly introduced on an interposing basis. Thereby, it is possible to shorten the expected response time without impairing the continuity of a music program or a picture program represented by a reproduced information stream.

The information file control system of Japanese application 6-1430 is effective under the conditions where an audio information file and a video information file are in continuous areas of a recording medium.

Generally, a recording system having the function of placing an information file in a continuous area of a recording medium is unsuited to a use which requires information files of different sizes to be repetitively recorded and erased. On the other hand, in a recording system suited to repetitive record and erasion, an information file is divided into clusters or allocation blocks, and the clusters or the allocation blocks are allowed to be placed in discontinuous areas of a recording medium.

In the case where information corresponding to one file is distributed over discontinuous areas of a recording medium, an extra access time is spent upon a change of the accessed area from one to another during the reproduction of the information from the recording medium. Accordingly, in this case, the efficiency of the transmission of the information tends to be low. Such a situation is referred to as a bad-fragmentation situation. When the information contains audio information or video information, a reproduced sound or a reproduced picture is interrupted upon a change of the accessed area from one to another.

Japanese published unexamined patent application 6-83674 discloses a reproducing apparatus for a multiple channel information file. In the reproducing apparatus of Japanese application 6-83674, information pieces are transmitted from a recording medium to respective buffer memories at a high speed (a high transmission rate) on a time-division basis or a time sharing basis. An information file on the recording medium is managed so that an integer multiple of the amount of an information piece transmitted from the recording medium to a related buffer memory during one time slot will be equal to the magnitude of one cluster (one allocation block) on the recording medium. In the reproducing apparatus of Japanese application 6-83674, since one cluster is mapped on a continuous area, a loss time Ta can be remarkably short. In addition, once the size of clusters is decided, it is unnecessary to pay attention to a deterioration in the fragmentation. Furthermore, a high efficiency of the transmission of information is available.

As previously indicated, in the reproducing apparatus of Japanese application 6-83674, the amount of an information piece transmitted from the recording medium to a related buffer memory during one time slot is equal to the magnitude of one cluster (one allocation block) on the recording medium which is divided by an integer. Therefore, the reproducing apparatus of Japanese application 6-83674 is unsuited to a system in which the amount of an accessed information piece is variable or an information piece transmitted from a recording medium to a related buffer memory contains a necessary information piece and also a reserve data piece.

First Embodiment

Figure 2:
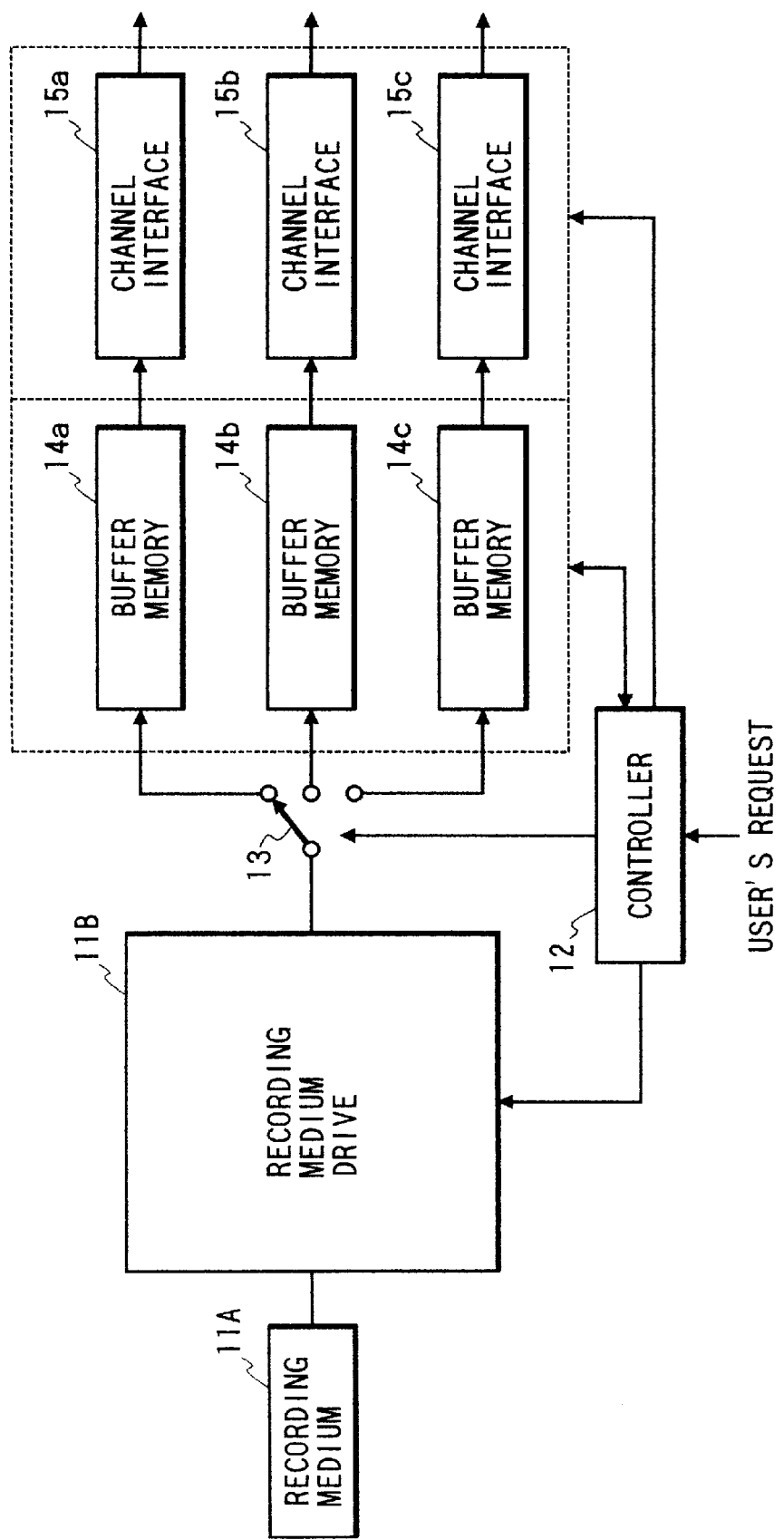
FIG. 2 is a block diagram of an information reproducing apparatus according to a first embodiment of this invention.

With reference to FIG. 2, a 3-channel information reproducing apparatus (a 3-channel information retrieving apparatus) includes a recording medium 11A, a recording medium drive 11B, a controller 12, an interface circuit (a selectable memory writer circuit) 13, buffer memories 14a, 14b, and 14c, and channel interfaces 15a, 15b, and 15c. The buffer memories 14a, 14b, and 14c are assigned to first, second, and third channels, respectively. The channel interfaces 15a, 15b, and 15c are assigned to the first, second, and third channels, respectively.

The recording medium 11A uses, for example, a magnetic recording medium called a hard disk. The recording medium 11A is driven by the recording medium drive 11B. The recording medium drive 11B is connected to the interface circuit 13. The interface circuit 13 is connected to the input sides of the buffer memories 14a, 14b, and 14c. The buffer memories 14a, 14b, and 14c are of, for example, the FIFO type. The output sides of the buffer memories 14a, 14b, and 14c are connected to the input sides of the channel interfaces 15a, 15b, and 15c, respectively. The output sides of the channel interfaces 15a, 15b, and 15c can be connected to user's terminal devices via communication lines, respectively. The controller 12 is connected to the recording medium drive 11B, the interface circuit 13, the buffer memories 14a, 14b, and 14c, and the channel interfaces 15a, 15b, and 15c. The controller 12 can receive signals representing user's requests concerning the first, second, and third channels respectively. The controller 12 includes a computer, a digital signal processor, or a similar device. The controller 12 operates in accordance with a program stored in its internal ROM.

The recording medium 11A stores video/audio information which means video information, audio information, or a combination of video information and audio information. The recording medium drive 11B accesses the recording medium 11A and sequentially reads out video/audio information pieces from the recording medium 11A at a high speed (a high transmission rate) in response to a control signal fed from the controller 12. The controller 12 operates to start the readout of information from the recording medium 11A in response to a user's request. The recording medium drive 11B outputs the video/audio information pieces to the interface circuit 13. The interface circuit 13 cyclically distributes the video/audio information pieces to the buffer memories 14a, 14b, and 14c in response to a control signal fed from the controller 12. To this end, the interface circuit 13 has a switching function.

The controller 12 controls the buffer memories 14a, 14b, and 14c so that the video/audio information pieces will be written into the buffer memories 14a, 14b, and 14c. The controller 12 controls the channel interfaces 15a, 15b, and 15c so that they will access the buffer memories 14a, 14b, and 14c and will read out the video/audio information pieces therefrom at a low speed equal to an original speed (a low transmission rate equal to an original transmission rate).

Regarding each of the buffer memories 14a, 14b, and 14c, a video/audio information piece read out therefrom is continuously followed by a next video/audio information piece. The video/audio information pieces are passed through the buffer memories 14a, 14b, and 14c, and are transmitted toward user's terminal devices as continuous information streams.

It is preferable that the amount of an information piece transmitted from the recording medium 11A to a related buffer memory 14a, 14b, or 14c during one time slot is equal to the magnitude of one cluster (one allocation block) on the recording medium 11A which is divided by an integer or a natural number. Here, "amount" means the total number of bits.

The controller 12 is programmed to implement the following processes. It is assumed that the controller 12 receives three different signals of user's requests concerning the first, second, and third channels respectively. The controller 12 starts the recording medium drive 11B reproducing video/audio information pieces from the recording medium 11A in response to the user's requests.

Figure 3:
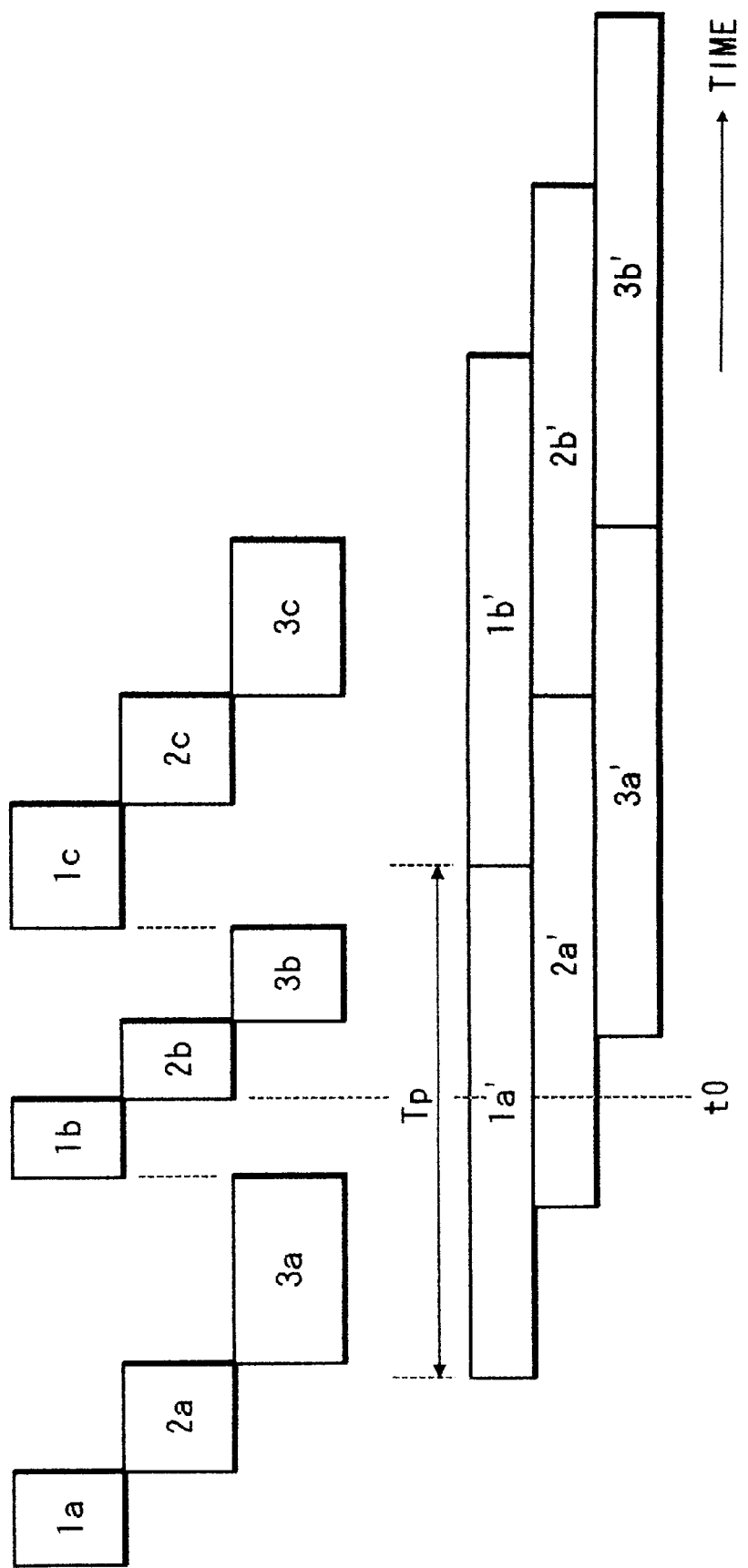
FIG. 3 is a time-domain diagram of transmitted information pieces in the information reproducing apparatus of FIG. 2.

With reference to FIG. 3, during a first cycle, video/audio information pieces are reproduced from the recording medium 11A by the recording medium drive 11B on a time-division basis as denoted by 1a, 2a, and 3a, and are transmitted via the interface circuit 13 to the respective buffer memories 14a, 14b, and 14c at high speeds (high transmission rates). During a second cycle following the first cycle, video/audio information pieces are reproduced from the recording medium 11A by the recording medium drive 11B on a time-division basis as denoted by 1b, 2b, and 3b, and are transmitted via the interface circuit 13 to the respective buffer memories 14a, 14b, and 14c at high speeds (high transmission rates). During a third cycle following the second cycle, video/audio information pieces are reproduced from the recording medium 11A by the recording medium drive 11B on a time-division basis as denoted by 1c, 2c, and 3c, and are transmitted via the interface circuit 13 to the respective buffer memories 14a, 14b, and 14c at high speeds (high transmission rates). During each of later cycles, processes similar to the above-indicated processes are implemented. Generally, the time length of one cycle is variable. The time interval of each cycle is composed of a sequence of variable first-channel, second-channel, and third-channel time slots.

For the first channel, video/audio information pieces are reproduced from the recording medium 11A by the recording medium drive 11B during first-channel time slots as denoted by 1a, 1b, and 1c, and are sequentially transmitted via the interface circuit 13 to the first-channel buffer memory 14a at high speeds (high transmission rates). The video/audio information pieces 1a, 1b, and 1c are sequentially written into the first-channel buffer memory 14a. The amounts of the video/audio information pieces 1a, 1b, and 1c are equal to each other. Here, "amount" means the total number of bytes. The reproduction time lengths of the video/audio information pieces 1a, 1b, and 1c are different from each other since conditions of the recording medium 11A and the recording medium drive 11B vary information piece by information piece.

For the second channel, video/audio information pieces are reproduced from the recording medium 11A by the recording medium drive 11B during second-channel time slots as denoted by 2a, 2b, and 2c, and are sequentially transmitted via the interface circuit 13 to the second-channel buffer memory 14b at high speeds (high transmission rates).

The video/audio information pieces 2a, 2b, and 2c are sequentially written into the second-channel buffer memory 14b. The amounts of the video/audio information pieces 2a, 2b, and 2c are equal to each other. The reproduction time lengths of the video/audio information pieces 2a, 2b, and 2c are different from each other since conditions of the recording medium 11A and the recording medium drive 11B vary information piece by information piece.

For the third channel, video/audio information pieces are reproduced from the recording medium 11A by the recording medium drive 11B during third-channel time slots as denoted by 3a, 3b, and 3c, and are sequentially transmitted via the interface circuit 13 to the third-channel buffer memory 14c at high speeds (high transmission rates). The video/audio information pieces 3a, 3b, and 3c are sequentially written into the third-channel buffer memory 14c. The amounts of the video/audio information pieces 3a, 3b, and 3c are equal to each other. The reproduction time lengths of the video/audio information pieces 3a, 3b, and 3c are different from each other since conditions of the recording medium 11A and the recording medium drive 11B vary information piece by information piece.

Regarding the first channel, the first video/audio information piece 1a is read out from the first-channel buffer memory 14a in a time Tp at an original speed (an original transmission rate) Vu as denoted by 1a'. The original speed is lower than the speed of the reading of the first video/audio information piece from the recording medium 11A. The first video/audio information piece 1a' is transmitted to a user's terminal device via the first-channel interface 15a.

Regarding the first channel, before the first video/audio information piece 1a' terminates, the second video/audio information piece is reproduced from the recording medium 11A and is transmitted to and written into the first-channel buffer memory 14a at a high speed (a high transmission rate) as denoted by 1b. The second video/audio information piece starts to be read out from the first-channel buffer memory 14a at the original speed (the original transmission rate) as denoted by 1b' after the end of the first video/audio information piece 1a'. The original speed is lower than the speed of the reading of the second video/audio information piece from the recording medium 11A. The time Tp is spend in the readout of the second video/audio information piece from the first-channel buffer memory 14a. The second video/audio information piece 1b' follows the first video/audio information piece 1a' without any time interval (any discontinuity) therebetween. The second video/audio information piece 1b' is transmitted to the user's terminal device via the first-channel interface 15a.

When the transmission of the first-channel video/audio information piece 1a from the recording medium 11A has been completed, the second-channel video/audio information piece immediately starts to be reproduced from the recording medium 11A by the recording medium drive 11B at a high speed as denoted by 2a. The amount of the second-channel video/audio information piece 2a is equal to the amount of the first-channel video/audio information piece 1a.

Regarding the second channel, the first video/audio information piece 2a is transmitted from the recording medium drive 11B to the second-channel buffer memory 14b via the interface circuit 13 before being written into the second-channel buffer memory 14b. The first video/audio information piece 2a is read out from the second-channel buffer memory 14b in the time Tp at the original speed (the original transmission rate) Vu as denoted by 2a'. The original speed is lower than the speed of the reading of the first video/audio information piece from the recording medium 11A. The first video/audio information piece 2a' is transmitted to a user's terminal device via the second-channel interface 15b.

Regarding the second channel, before the first video/audio information piece 2a' terminates, the second video/audio information piece is reproduced from the recording medium 11A and is transmitted to and written into the second-channel buffer memory 14b at a high speed (a high transmission rate) as denoted by 2b. The second video/audio information piece starts to be read out from the second-channel buffer memory 14b at the original speed (the original transmission rate) as denoted by 2b' after the end of the first video/audio information piece 2a'. The original speed is lower than the speed of the reading of the second video/audio information piece from the recording medium 11A.

The time Tp is spend in the readout of the second video/audio information piece from the second-channel buffer memory 14b. The second video/audio information piece 2b' follows the first video/audio information piece 2a' without any time interval (any discontinuity) therebetween. The second video/audio information piece 2b' is transmitted to the user's terminal device via the second-channel interface 15b.

When the transmission of the second-channel video/audio information piece 2a from the recording medium 11A has been completed, the third-channel video/audio information piece immediately starts to be reproduced from the recording medium 11A by the recording medium drive 11B at a high speed as denoted by 3a. The amount of the third-channel video/audio information piece 3a is equal to the amount of the second-channel video/audio information piece 2a.

Regarding the third channel, the first video/audio information piece 3a is transmitted from the recording medium drive 11B to the third-channel buffer memory 14c via the interface circuit 13 before being written into the third-channel buffer memory 14c. The first video/audio information piece 3a is read out from the third-channel buffer memory 14c in the time Tp at the original speed (the original transmission rate) Vu as denoted by 3a'. The original speed is lower than the speed of the reading of the first video/audio information piece from the recording medium 11A. The first video/audio information piece 3a' is transmitted to a user's terminal device via the third-channel interface 15c.

Regarding the third channel, before the first video/audio information piece 3a' terminates, the second video/audio information piece is reproduced from the recording medium 11A and is transmitted to and written into the third-channel buffer memory 14c at a high speed (a high transmission rate) as denoted by 3b. The second video/audio information piece starts to be read out from the third-channel buffer memory 14c at the original speed (the original transmission rate) as denoted by 3b' after the end of the first video/audio information piece 3a'. The original speed is lower than the speed of the reading of the second video/audio information piece from the recording medium 11A. The time Tp is spend in the readout of the second video/audio information piece from the third-channel buffer memory 14c. The second video/audio information piece 3b' follows the first video/audio information piece 3a' without any time interval (any discontinuity) therebetween. The second video/audio information piece 3b' is transmitted to the user's terminal device via the third-channel interface 15c.

As previously explained, the time lengths of the transmission of video/audio information pieces from the recording medium 11A to the buffer memories 14a, 14b, and 14c are generally different from each other although the amounts of the video/audio information pieces are equal to each other. In view of these conditions, the controller 12 is programmed to implement the following processes. The controller 12 periodically calculates the sizes of unoccupied areas in the respective buffer memories 14a, 14b, and 14c by referring to conditions of the writing of information pieces into the buffer memories 14a, 14b, and 14c and also conditions of the readout of information pieces therefrom. The controller 12 periodically decides whether or not each of the calculated sizes of unoccupied areas in the buffer memories 14a, 14b, and 14c is smaller than a predetermined size. In the case where a buffer memory (referred to as the buffer memory in question) which will undergo a writing process next has an unoccupied area of the predetermined size or greater, the controller 12 allows the recording medium drive 11B to read out a video/audio information piece from the recording medium 11A and to transmit the readout video/audio information piece toward the buffer memory in question via the interface circuit 13. On the other hand, in the case where a buffer memory (referred to as the buffer memory in question) which will undergo a writing process next has an unoccupied area of smaller than the predetermined size, the controller 12 inhibits the recording medium drive 11B from reading out a video/audio information piece from the recording medium 11A. In this case, waiting is done until the unoccupied area in the buffer memory in question increases to the predetermined size. In certain situations, first and second portions of the buffer memory in question are occupied by first and second video/audio information pieces respectively while a third portion of the buffer memory in question is being loaded with a third video/audio information piece.

The buffer memories 14a, 14b, and 14c may have the functions of outputting signals representing the sizes of unoccupied areas therein. In this case, the controller 12 periodically samples the size-representing output signals of the buffer memories 14a, 14b, and 14c to derive information of the sizes of unoccupied areas therein.

With reference to FIG. 3, regarding the first channel, before the first video/audio information piece 1a' terminates (before the second video/audio information piece 1b' starts), the third video/audio information piece 1c starts to be transmitted from the recording medium 11A to the first-channel buffer memory 14a. At a moment t0 during the readout of the first video/audio information piece 1a' from the first-channel buffer memory 14a, the writing of the second video/audio information piece 1b into the first-channel buffer memory 14a is completed. A portion of the first video/audio information piece 1a' which remains in the first-channel buffer memory 14a at the moment t0 corresponds to a reserve data piece. Then, the reserve data piece continues to be read out from the first-channel buffer memory 14a as a remaining portion of the first video/audio information piece 1a'. Before the first video/audio information piece 1a' terminates, that is, before the second video/audio information piece 1b' starts to be read out from the first-channel buffer memory 14a, the third video/audio information piece 1c starts to be transmitted from the recording medium 11A to the first-channel buffer memory 14a provided that an unoccupied area in the first-channel buffer memory 14a is equal to or greater than the predetermined size.

Such processes are implemented also regarding the second-channel buffer memory 14b, and the third-channel buffer memory 14c.

Accordingly, the amounts of video/audio information in the buffer memories 14a, 14b, and 14c are relatively great. Thus, fragmentation on the recording medium 11A is prevented from adversely affecting the rates (the speeds) of the transmission of video/audio information pieces. In addition, it is possible to provide a quick response to a new user's request.

As understood from the above explanation, the reading of an information piece from the recording medium and the writing of the information piece to the buffer memory (14a, 14b, or 14c) are temporally independent of the reading of a preceding information piece from the buffer memory. In other words, the reading of an information piece from the recording medium and the writing of the information piece to the buffer memory (14a, 14b, or 14c) are asynchronous with the reading of a preceding information piece from the buffer memory.

It should be noted that when the buffer memory (14a, 14b, or 14c) has an insufficient unoccupied area, the amount of a video/audio information piece which corresponds to the insufficient unoccupied area may be transmitted from the recording medium 11A to the buffer memory.

An information file on the recording medium 11A may be managed so that an integer multiple of the amount of an information piece transmitted from the recording medium to a related buffer memory during one time slot will be equal to the magnitude of one cluster (one allocation block) on the recording medium 11A. In this case, the transmission of an information piece may be skipped, and its control may be passed to time-division processing for a next channel.

Second Embodiment

Figure 4:
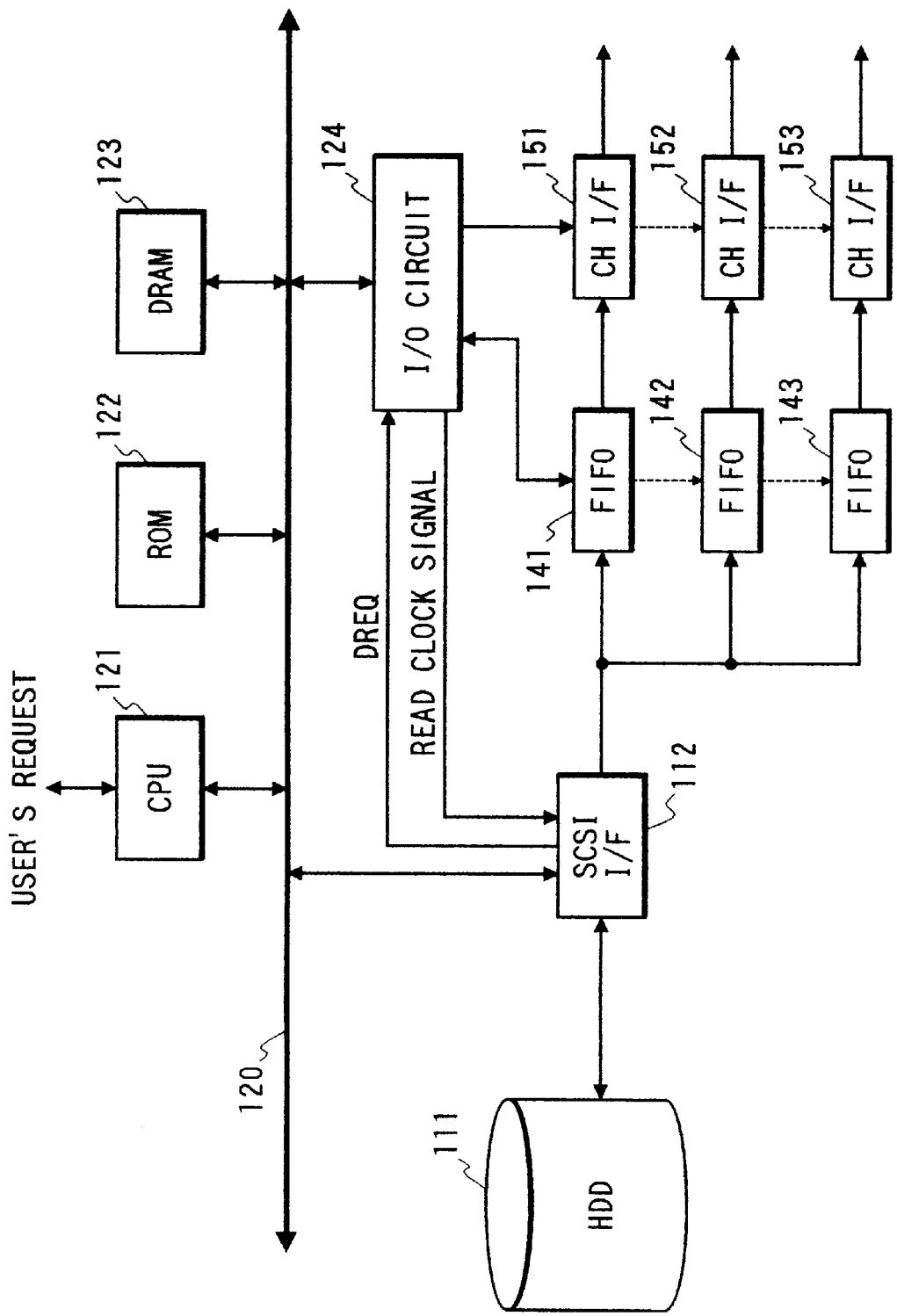
FIG. 4 is a block diagram of an information reproducing apparatus according to a second embodiment of this invention.

FIG. 4 shows a 3-channel information reproducing apparatus (a 3-channel information retrieving apparatus) which is similar in basic operation to the information reproducing apparatus of FIG. 2.

With reference to FIG. 4, the information reproducing apparatus includes a combination 111 of a hard disk and a hard disk drive. The combination 111 is also referred to as the hard disk device 111.

The information reproducing apparatus of FIG. 4 further includes an interface 112, a CPU 121, a ROM 122, a DRAM 123, an input/output circuit 124, FIFO memories 141, 142, and 143, and channel interfaces 151, 152, and 153.

The hard disk device 111 is connected to the interface 112. The interface 112 is of the SCSI type. The interface 112, the CPU 121, the ROM 122, the DRAM 123, and the input/output circuit 124 are connected via a bus 120. The CPU 121 can receive signals representing user's requests concerning first, second, and third channels respectively. The interface 112 is connected to the input/output circuit 124 via signal lines different from the bus 120. The interface 112 is connected to the input sides of the FIFO memories 141, 142, and 143. The FIFO memories 141, 142, and 143 serve as buffer memories. The FIFO memories 141, 142, and 143 are assigned to the first, second, and third channels, respectively. The output sides of the FIFO memories 141, 142, and 143 are connected to the input sides of the channel interfaces 151, 152, and 153, respectively. The output sides of the channel interfaces 151, 152, and 153 can be connected to user's terminal devices via communication lines, respectively. The channel interfaces 151, 152, and 153 are assigned to the first, second, and third channels, respectively. The FIFO memories 141, 142, and 143 are connected to the input/output circuit 124. The channel interfaces 151, 152, and 153 are connected to the input/output circuit 124.

The input/output circuit 124 includes signal generators which produce a read clock signal for the interface 112, write clock signals for the FIFO memories 141, 142, and 143, and timing control signals for the channel interfaces 151, 152, and 153. The timing control signals for the channel interfaces 151, 152, and 153 include read instructions which will be indicated later.

The ROM 122 stores a program. The CPU 121 operates in accordance with the program in the ROM 122. The program in the ROM 122 is designed to implement the following processes.

The hard disk device 111 stores video/audio information which means video information, audio information, or a combination of video information and audio information. It is assumed that the CPU 121 receives three different signals of user's requests concerning the first, second, and third channels respectively. The hard disk device 111 sequentially outputs video/audio information pieces at a high speed (a high transmission rate) in response to a control signal fed from the CPU 121 via the interface 112. The CPU 121 starts the hard disk device 111 outputting the video/audio information pieces in response to the user's requests. The video/audio information pieces are transmitted from the hard disk device 111 to the FIFO memories 141, 142, and 143 via the interface 112. The CPU 121 controls the input/output circuit 124 so that the input/output circuit 124 sequentially and cyclically outputs write clock signals to the FIFO memories 141, 142, and 143. Accordingly, the video/audio information pieces are written into the FIFO memories 141, 142, and 143 at different timings, respectively. In this way, the video/audio information pieces are cyclically distributed to the FIFO memories 141, 142, and 143 on a time division basis. The CPU 121 controls the channel interfaces 151, 152, and 153 via the I/O circuit 124 so that the channel interfaces 151, 152, and 153 will read out the video/audio information pieces from the FIFO memories 141, 142, and 143 respectively at a low speed equal to an original speed (a low transmission rate equal to an original transmission rate). The video/audio information pieces are passed through the channel interfaces 151, 152, and 153 before being transmitted toward user's terminal devices, respectively.

Figure 5:
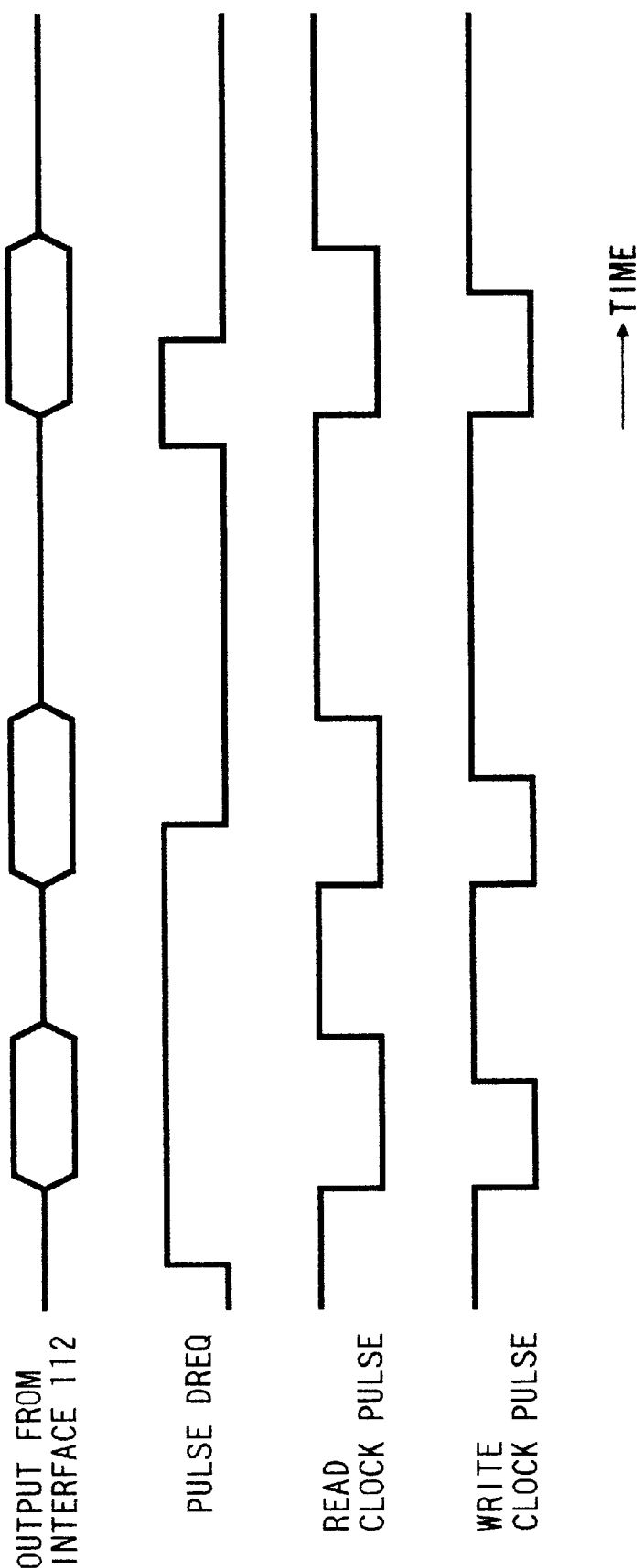
FIG. 5 is a time-domain diagram of signals in the information reproducing apparatus of FIG. 4.

Operation of the information reproducing apparatus of FIG. 4 will be further explained with reference to FIG. 5. When the CPU 121 receives a signal of a user's request concerning one of the first, second, and third channels, the CPU 121 feeds a read instruction to the hard disk device 111 via the interface 112. The hard disk device 111 is started and activated in response to the read instruction. The hard disk device 111 sequentially outputs desired video/audio information pieces designated by the read instruction. The video/audio information pieces outputted from the hard disk device 111 sequentially travel to the interface 112. The video/audio information pieces are sequentially written into a register or a buffer memory within the interface 112. When the interface 112 receives each of the video/audio information pieces from the hard disk device 111, the interface 112 outputs a signal pulse DREQ to the I/O circuit 124. Each signal pulse DREQ represents the completion of the readout of one information piece by the hard disk device 111. Examples of the waveforms of signal pulses DREQ are shown in FIG. 5.

The I/O circuit 124 generates a read clock pulse or pulses in response to each signal pulse DREQ. Examples of the waveforms of read clock pulses are shown in FIG. 5. Each read clock pulse is of the low-level type or the negative going type in FIG. 5. Also, the I/O circuit 124 generates a write clock pulse or pulses in response to each signal pulse DREQ. Examples of the waveforms of write clock pulses are shown in FIG. 5. Each write clock pulse is of the low-level type or the negative going type in FIG. 5. The I/O circuit 124 outputs each read clock pulse to the interface 112. The I/O circuit 124 outputs each write clock pulse to only one of the FIFO memories 141, 142, and 143 which is designated by the CPU 121, and which relates to the channel in question.

The interface 112 outputs the video/audio information pieces to the FIFO memories 141, 142, and 143 in response to read clock pulses fed from the I/O circuit 124. An example of the waveform of the output signal of the interface 112, which represents the video/audio information pieces, is shown in FIG. 5. The video/audio information pieces are sequentially written into designated one of the FIFO memories 141, 142, and 143 in response to write clock pulses outputted by the I/O circuit 124. Each of the FIFO memories 141, 142, and 143 informs the CPU 121 of the size of an unoccupied area therein via the I/O circuit 124. The CPU 121 controls the I/O circuit 124 in response to the size of the unoccupied area so that the timing of the application of a write clock signal to the related FIFO memory will depend on the size of the unoccupied area. The CPU 121 selects one of the channel interfaces 151, 152, and 153 via the I/O circuit 124. The selected channel interface corresponds to the designed FIFO memory. The CPU 121 controls the selected channel interface via the I/O circuit 124 so that the selected channel interface will sequentially read out the video/audio information pieces from the designated FIFO memory. A video/audio information piece read out from the designated FIFO memory is continuously followed by a next readout video/audio information piece. The video/audio information pieces composing a continuous information stream are sequentially transmitted from the designated FIFO memory toward a user's terminal device via the selected channel interface.

The CPU 121 periodically receives information of the size of an unoccupied area in each of the FIFO memories 141, 142, and 143. The size information is transmitted from each of the FIFO memories 141, 142, and 143 to the CPU 121 via the I/O circuit 124. Alternatively, the CPU 121 may periodically calculates the size of an unoccupied area in each of the FIFO memories 141, 142, and 143 by referring to conditions of the writing of information pieces into the FIFO memory and also conditions of the readout of information pieces therefrom. The CPU 121 periodically decides whether or not each of the sizes of unoccupied areas in the FIFO memories 141, 142, and 143 is smaller than a predetermined size. In the case where an FIFO memory (referred to as the FIFO memory in question) which will undergo a writing process next has an unoccupied area of the predetermined size or greater, the CPU 121 allows the hard disk device 111 to output a video/audio information piece to the interface 112. In this case, the video/audio information piece is transmitted to the FIFO memory in question via the interface 112. On the other hand, in the case where an FIFO memory (referred to as the FIFO memory in question) which will undergo a writing process next has an unoccupied area of smaller than the predetermined size, the CPU 121 inhibits the hard disk device 111 from outputting a video/audio information piece to the interface 112. In this case, waiting is done until the unoccupied area in the FIFO memory in question increases to the predetermined size.

Figure 6:
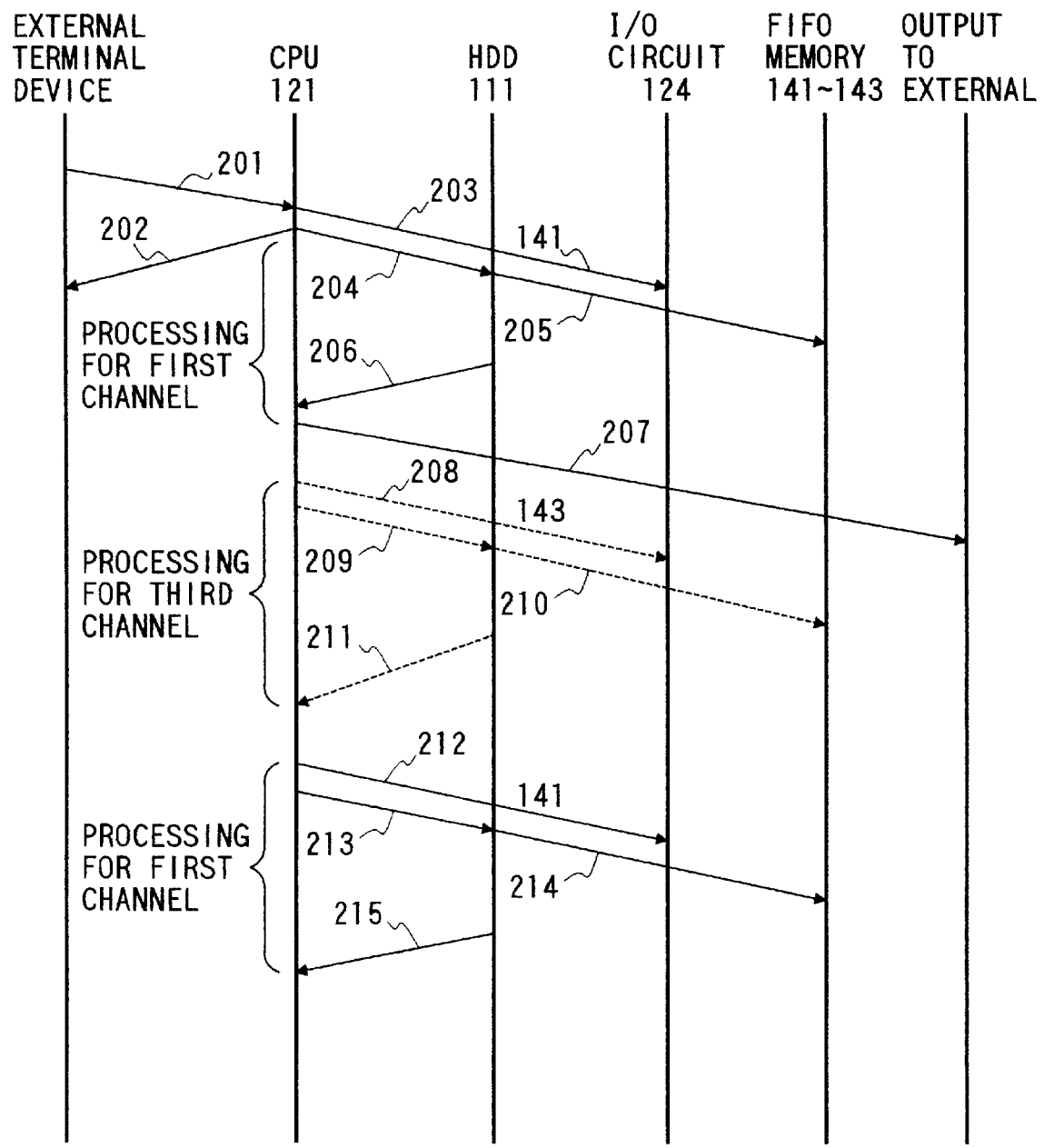
FIG. 6 is a diagram of a sequence of signals in the information reproducing apparatus of FIG. 4.

Operation of the information reproducing apparatus of FIG. 4 will be further explained with reference to FIG. 6. When the CPU 121 receives a signal of a first-channel user's request 201 from an external terminal device, the CPU 121 returns a response signal 202 thereto which indicates acceptance. In addition, the CPU 121 feeds an instruction 203 to the I/O circuit 124 which requires the I/O circuit 124 to output a write clock signal to only the first-channel FIFO memory 141.

Subsequently, the CPU 121 feeds a read instruction 204 to the hard disk device 111 via the interface 112. The hard disk device 111 is started and activated in response to the read instruction 204. The hard disk device 111 outputs a first desired video/audio information piece 205 designated by the read instruction 204. The speed (the transmission rate) of the outputting of the first video/audio information piece 205 from the hard disk device 111 is equal to a high speed (a high transmission rate). The first video/audio information piece 205 outputted from the hard disk device 111 travels to the first-channel FIFO memory 141 via the interface 112. The first video/audio information piece 205 is written into the first-channel FIFO memory 141 by a write clock signal outputted by the I/O circuit 124. When the transmission of the first video/audio information piece 205 from the hard disk device 111 to the first-channel FIFO memory 141 is completed, the interface 112 notifies the CPU 121 of a transmission end 206. Then, the CPU 121 feeds a read instruction 207 to only the first-channel interface 151 via the I/0 circuit 124. The first-channel interface 151 reads out the first video/audio information piece from the first-channel FIFO memory 141 in response to the read instruction 207 at a low speed equal to an original speed. The first video/audio information piece is transmitted toward a user's terminal device via the first-channel interface 151.

Examples of the values of parameters are as follows. The amount of each video/audio information piece transmitted from the hard disk device 111 to one of the FIFO memories 141, 142, and 143 is equal to 220.5 kB. Here, "amount" means the total number of bytes. An original speed (an original transmission rate) related to each video/audio information piece in the hard disk device 111 is equal to 1.4112 Mbps. Each video/audio information piece is transmitted from the hard disk device 111 to one of the FIFO memories 141, 142, and 143 at a speed (a transmission rate) equal to M times the original speed. Here, M denotes a predetermined natural number.

In the case where the CPU 121 receives a signal of a third-channel user's request from an external terminal device before the reception of the signal of the first-channel user's request 201, a sequence of steps for the third channel is executed before the sequence of the above-mentioned steps for the first channel. After the sequence of the above-mentioned steps for the first channel has been completed, a next sequence of steps for the third channel is executed as follows. After the feed of the read instruction 207 to the first-channel interface 151, the CPU 121 feeds an instruction 208 to the I/O circuit 124 which requires the I/O circuit 124 to output a write clock signal to only the third-channel FIFO memory 143.

Subsequently, the CPU 121 feeds a read instruction 209 to the hard disk device 111 via the interface 112. The hard disk device 111 is started and activated in response to the read instruction 209. The hard disk device 111 outputs a desired video/audio information piece 210 designated by the read instruction 209. The video/audio information piece 210 outputted from the hard disk device 111 travels to the third-channel FIFO memory 143 via the interface 112. The video/audio information piece 210 is written into the third-channel FIFO memory 143 by a write clock signal outputted by the I/O circuit 124. When the transmission of the video/audio information piece 210 from the hard disk device 111 to the third-channel FIFO memory 143 is completed, the interface 112 notifies the CPU 121 of a transmission end 211.

After the notification of the transmission end 211, the CPU 121 feeds an instruction 212 to the I/O circuit 124 which requires the I/O circuit 124 to output a write clock signal to only the first-channel FIFO memory 141.

Subsequently, the CPU 121 feeds a read instruction 213 to the hard disk device 111 via the interface 112 provided that the size of an unoccupied area in the first-channel FIFO memory 141 is equal to or greater than the predetermined size. If the size of the unoccupied area in the first-channel FIFO memory 141 is smaller than the predetermined size, the CPU 121 implements waiting until the unoccupied area increases to the predetermined size. The hard disk device 111 is started and activated in response to the read instruction 213. The hard disk device 111 outputs a second desired video/audio information piece 214 designated by the read instruction 213. The speed (the transmission rate) of the outputting of the second video/audio information piece 213 from the hard disk device 111 is equal to a high speed (a high transmission rate). The second video/audio information piece 213 outputted from the hard disk device 111 travels to the first-channel FIFO memory 141 via the interface 112. The second video/audio information piece 213 is written into the first-channel FIFO memory 141 by a write clock signal outputted by the I/O circuit 124. When the transmission of the second video/audio information piece 213 from the hard disk device 111 to the first-channel FIFO memory 141 is completed, the interface 112 notifies the CPU 121 of a transmission end 215.

Thereafter, processes similar to the above-indicated processes are reiterated. In the case where a new user's request occurs during the transmission of a video/audio information piece from the hard disk device 111 to one of the FIFO memories 141, 142, and 143, waiting is done until the transmission of the present video/audio information piece is completed. When the transmission of the present video/audio information piece is completed, a video/audio information piece desired by the new user's request starts to be transmitted from the hard disk device 111 to corresponding one of the FIFO memories 141, 142, and 143 on an interruption basis.

The program for controlling the CPU 121 has a main segment (a main routine) and sub segments (sub routines). The main routine of the program is started when the information reproducing apparatus of FIG. 4 is turned on.

Figure 7:
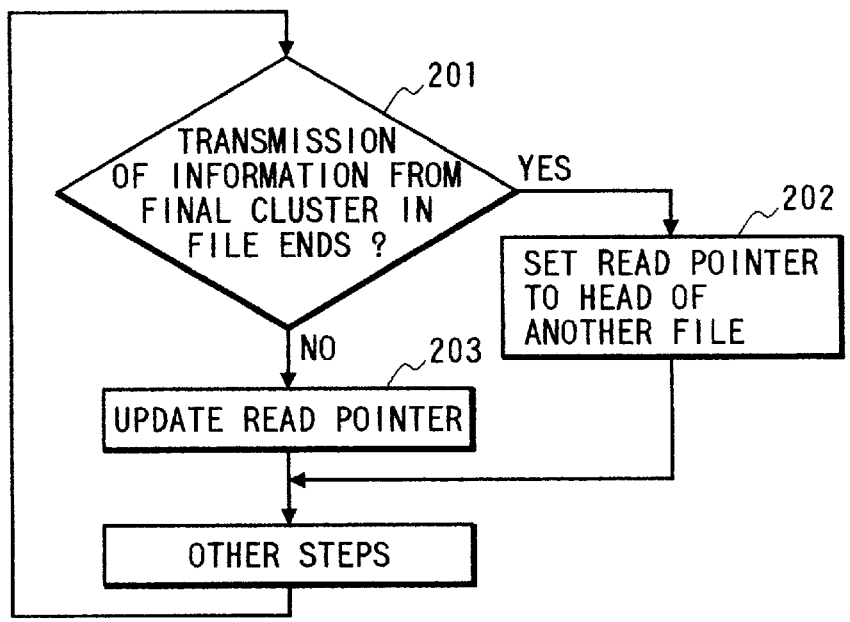
FIG. 7 is a flowchart of a part of a main routine of a program for controlling a CPU in FIG. 4.

FIG. 7 is a flowchart of a part of the main routine of the program. As shown in FIG. 7, a step 201 decides whether or not the transmission of a video/audio information piece from the final cluster in a currently-accessed file on the recording medium has been completed. When the transmission has been completed, the program advances from the step 201 to a step 202. Otherwise, the program advances from the step 201 to a step 203.

The step 202 sets a read pointer to a head of a next file or another file on the recording medium. Here, the read pointer designates an accessed position on the recording medium.

The step 203 updates the read pointer to access a next cluster in the currently-accessed file on the recording medium.

The steps 202 and 203 are followed by other steps. After the other steps, the program returns to the step 201. Here, "file" corresponds to, for example, a tune.

Figure 8:
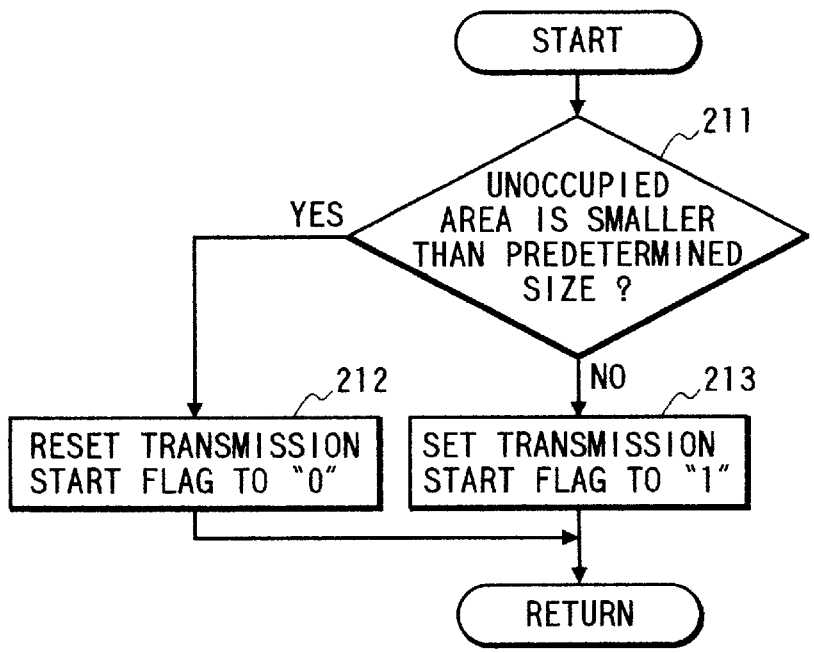
FIG. 8 is a flowchart of a first sub segment of the program for controlling the CPU in FIG. 4.

FIG. 8 is a flowchart of a first sub segment of the program which is iteratively executed at a predetermined period by timer-based interruption during the execution of the main routine of the program. The sub program segment in FIG. 8 is executed for each of the FIFO memories 141, 142, and 143.

With reference to FIG. 8, a first step 211 of the first sub segment of the program calculates the size of an unoccupied area in a present FIFO memory by referring to conditions of the writing of information pieces into the present FIFO memory and also conditions of the readout of information pieces therefrom. The step 211 may derive information of the size of an unoccupied area in the present FIFO memory from a size signal outputted by the present FIFO memory.

The step 211 decides whether or not the size of the unoccupied area in the present FIFO memory is smaller than the predetermined size. When the size of the unoccupied area is smaller than the predetermined size, the program advances from the step 211 to a step 212. When the size of the unoccupied area is equal to or greater than the predetermined size, the program advances from the step 211 to a step 213.

The step 212 resets a transmission start flag to "0". After the step 212, the current execution cycle of the sub program segment in FIG. 8 ends and the program returns to the main routine. As will be made clear later, the transmission start flag being "0" inhibits the hard disk device 111 from outputting a next video/audio information piece to the interface 112.

The step 213 sets the transmission start flag to "1". After the step 213, the current execution cycle of the sub program segment in FIG. 8 ends and the program returns to the main routine. As will be made clear later, the transmission start flag being "1" allows the hard disk device 111 to output a next video/audio information piece to the interface 112.

Figure 9:
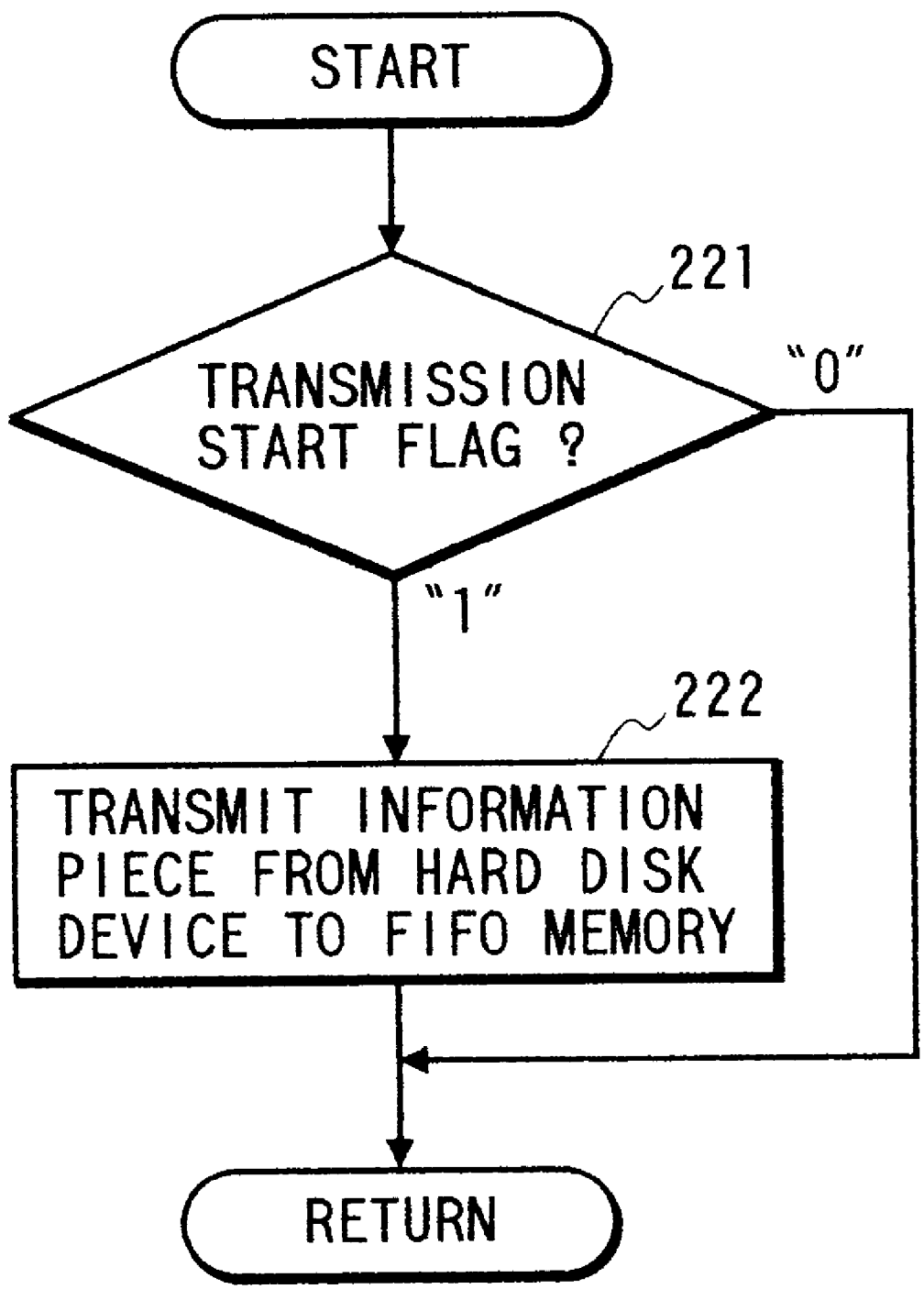
FIG. 9 is a flowchart of a second sub segment of the program for controlling the CPU in FIG. 4.

FIG. 9 is a flowchart of a second sub segment of the program which is executed by interruption in response to the end of the transmission of a current video/audio information piece from the hard disk device 111 during the execution of the main routine of the program. Information of the end of the transmission of the current video/audio information piece is fed from the hard disk device 111 or the interface 112. The sub program segment in FIG. 9 is executed for each of the FIFO memories 141, 142, and 143.

As shown in FIG. 9, a first step 221 of the second sub segment of the program decides whether or not the transmission start flag assigned to a present FIFO memory is "1" or "0". When the transmission start flag is "1", the program advances from the step 221 to a step 222. When the transmission start flag is "0", the program exits from the step 221 and the current execution cycle of the sub program segment in FIG. 9 ends. Then, the program returns to the main routine.

The step 222 starts the hard disk device 111 outputting a next video/audio information piece to the present FIFO memory via the interface 112. In other words, the step 222 implements the transmission of the next video/audio information piece from the hard disk device 111 to the present FIFO memory. After the step 222, the current execution cycle of the sub program segment in FIG. 9 ends and the program returns to the main routine.

When the step 221 decides that the transmission start flag is "0", the step 222 is unexecuted. Thus, in this case, the hard disk device 111 is inhibited from outputting a next video/audio information piece toward the present FIFO memory via the interface 112, and waiting is done until the unoccupied area in the present FIFO memory increases to the predetermined size.

Third Embodiment

Figure 10:
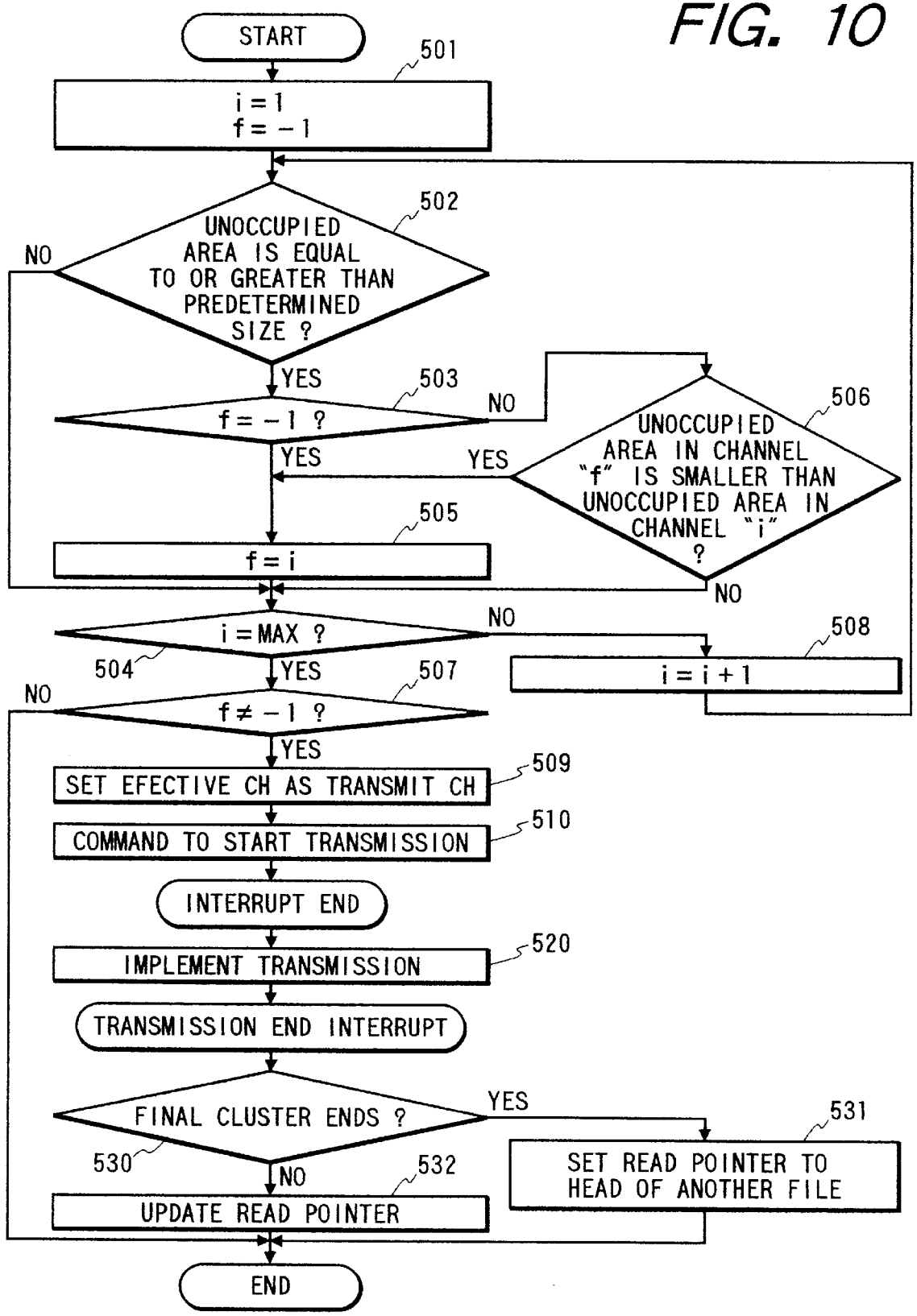
FIG. 10 is a flowchart of a program for controlling a CPU in a third embodiment of this invention.

A third embodiment of this invention is similar to the second embodiment thereof except that the program for the CPU 121 which is shown in FIGS. 7, 8, and 8 is replaced by a program in FIG. 10.

A first step 501 in the program of FIG. 10 is started by interruption. The step 501 initializes a variable "i" to "1". The variable "i" indicates the channel of interest. In addition, the step 501 initializes a variable "f" to "−1". The variable "f" indicates the effective channel. After the step 501, the program advances to a step 502.

The step 502 compares the size of an unoccupied area in the FIFO memory with a predetermined size regarding the channel "i" of interest. When the size of the unoccupied area is equal to or greater than the predetermined size, the program advances from the step 502 to a step 503. Otherwise, the program jumps from the step 502 to a step 504.

The step 503 decides whether or not the value "f" is equal to "−1". When the value "f" is equal to "−1", the program advances from the step 503 to a step 505. Otherwise, the program advances from the step 503 to a step 506.

The step 506 decides whether or not the size of an unoccupied area in the FIFO memory of the effective channel "f" is smaller than the size of the unoccupied area in the FIFO memory of the channel "i" of interest. When the size of the unoccupied area in the FIFO memory of the effective channel "f" is smaller than the size of the unoccupied area in the FIFO memory of the channel "i" of interest, the program advances from the step 506 to the step 505. Otherwise, the program advances from the step 506 to the step 504.

The step 505 sets the effective channel value "f" to the value "i" of the channel of interest. After the step 505, the program advances to the step 504.

The step 504 decides whether or not the value "i" of the channel of interest is equal to a maximum number. When the value "i" of the channel of interest is equal to the maximum number, the program advances from the step 504 to a step 507. Otherwise, the program advances from the step 504 to a step 508.

The step 508 increments the value "i" of the channel of interest by "1". After the step 508, the program returns to the step 502.

The step 507 compares the effective channel value "f" with "−1" to decide whether or not the effective channel is present. When the effective channel is present, the program advances from the step 507 to a step 509. Otherwise, the program exits from the step 507 and then the current execution cycle of the program in FIG. 10 ends.

The step 509 sets the effective channel "f" as a transmission channel.

A step 510 following the step 509 generates or outputs a command to start the transmission of a next video/audio information piece from the hard disk device 111 to the FIFO memory in the transmission channel.

After the step 510, the present interruption ends and then the program enters a step 520. The step 520 implements the transmission of the next video/audio information piece from the hard disk device 111 to the FIFO memory in the transmission channel.

After the step 520, the program enters a step 530 via an interruption stage. The step 530 decides whether or not the transmission of a video/audio information piece from the final cluster in a currently-accessed file on the recording medium has been completed. When the transmission has been completed, the program advances from the step 530 to a step 531. Otherwise, the program advances from the step 530 to a step 532.

The step 531 sets a read pointer to a head of a next file or another file on the recording medium. Here, the read pointer designates an accessed position on the recording medium. After the step 531, the current execution cycle of the program in FIG. 10 ends.

The step 532 updates the read pointer to access a next cluster in the currently-accessed file on the recording medium. After the step 532, the current execution cycle of the program in FIG. 10 ends.

What is claimed is:

1. An information reproducing apparatus comprising:

a recording medium storing information;

buffer memories assigned to channels respectively;

first means for detecting a size of an unoccupied area in each of the buffer memories;

second means for sequentially reading out pieces of the information from the recording medium, and distributing the pieces of the information to the buffer memories and writing the pieces of the information into the buffer memories at first rates on a time-division basis;

third means for sequentially and continuously reading out the pieces of the information from the buffer memories in parallel at a second rate lower than the first rates; and fourth means for permitting the second means to read out a piece of the information from the recording medium and to write said piece of the information into one of the buffer memories when the size detected by the first means and relating to said one of the buffer memories is equal to or greater than a predetermined size, and for inhibiting the second means from reading out a piece of the information from the recording medium and from writing said piece of the information into said one of the buffer memories when the size detected by the first means and relating to said one of the buffer memories is smaller than the predetermined size.

2. An information reproducing apparatus as recited in claim 1, wherein the buffer memories comprise FIFO memories.

3. An information reproducing apparatus as recited in claim 1, wherein the recording medium has discontinuous areas among which the information distributes.

4. An information reproducing apparatus comprising:

a recording medium storing information;

buffer memories assigned to channels respectively;

first means for detecting a size of an unoccupied area in each of the buffer memories;

second means for comparing the size of the unoccupied area in each of the buffer memories which is detected by the first means with a predetermined non-zero size to decide whether or not the size of the unoccupied area in each of the buffer memories which is detected by the first means is smaller than the predetermined non-zero size;

third means for sequentially reading out pieces of the information from the recording medium, and distributing the pieces of the information to the buffer memories and writing the pieces of the information into the buffer memories at first rates on a time-division basis;

fourth means for sequentially and continuously reading out the pieces of the information from the buffer memories in parallel at a second rate lower than the first rates; and fifth means for permitting the third means to read out a piece of the information from the recording medium and to write said piece of the information into one of the buffer memories when the second means decides that the size detected by the first means and relating to said one of the buffer memories is greater than the predetermined non-zero size, and for inhibiting the third means from reading out a piece of the information from the recording medium and from writing said piece of the information into said one of the buffer memories when the second means decides that the size detected by the first means and relating to said one of the buffer memories is smaller than the predetermined non-zero size.

5. An information reproducing apparatus comprising:

a recording medium storing information; buffer memories assigned to channels respectively;

first means for detecting a size of an unoccupied area in each of the buffer memories;

second means for sequentially reading out pieces of the information from the recording medium, and distributing the pieces of the information to the buffer memories and writing the pieces of the information into the buffer memories at first rates on a time-division basis, the pieces of the information being equal to a predetermined size;

third means for sequentially and continuously reading out the pieces of the information from the buffer memories in parallel at a second rate lower than the first rates; and fourth means for permitting the second means to read out a piece of the information from the recording medium and to write said piece of the information into one of the buffer memories when the size detected by the first means and relating to said one of the buffer memories is equal to or greater than the predetermined size and for inhibiting the second means from reading out when the detected size is smaller than the predetermined size.

* * * * *